(12) United States Patent
Wadhwa

(10) Patent No.: US 7,533,339 B2
(45) Date of Patent: May 12, 2009

(54) SYSTEM AND METHOD FOR PROVIDING USER HELP

(75) Inventor: Gaurav Wadhwa, Narnaul (IN)

(73) Assignee: SAP AG, Walldorf (DE)

( * ) Notice: Subject to any disclaimer, the term of this patent is extended or adjusted under 35 U.S.C. 154(b) by 342 days.

(21) Appl. No.: 11/319,417

(22) Filed: Dec. 29, 2005

(65) Prior Publication Data

US 2007/0157091 A1 Jul. 5, 2007

(51) Int. Cl.
*G06F 3/00* (2006.01)
(52) U.S. Cl. .................... 715/705; 715/707; 715/708
(58) Field of Classification Search .............. 395/12; 715/705, 707, 708
See application file for complete search history.

(56) References Cited

U.S. PATENT DOCUMENTS

| | | | | |
|---|---|---|---|---|
| 5,103,498 A * | 4/1992 | Lanier et al. | ................... | 706/58 |
| 5,311,422 A * | 5/1994 | Loftin et al. | .................... | 703/2 |
| 5,432,940 A * | 7/1995 | Potts et al. | .................. | 719/320 |
| 5,485,544 A * | 1/1996 | Nonaka et al. | ................ | 706/11 |
| 5,727,950 A * | 3/1998 | Cook et al. | ................. | 434/350 |
| 5,774,118 A * | 6/1998 | Hatakama | ................... | 715/707 |
| 6,005,569 A * | 12/1999 | Breggin | ...................... | 715/711 |
| 6,275,227 B1 * | 8/2001 | DeStefano | .............. | 369/30.01 |
| 6,341,359 B1 * | 1/2002 | Aiken et al. | ................ | 714/100 |
| 6,452,607 B1 * | 9/2002 | Livingston | .................. | 715/705 |
| 6,466,897 B1 * | 10/2002 | Yoshida | ...................... | 702/186 |
| 6,556,974 B1 * | 4/2003 | D'Alessandro | ............... | 705/10 |
| 6,597,314 B1 * | 7/2003 | Beezer et al. | ................ | 715/812 |
| 6,718,490 B1 * | 4/2004 | Takemoto et al. | ............. | 714/47 |
| 7,107,261 B2 * | 9/2006 | Farrett | ........................... | 707/3 |
| 7,272,793 B2 * | 9/2007 | Mutsuno et al. | ............. | 715/707 |
| 2001/0034742 A1 | 10/2001 | Stinson | | |
| 2002/0015056 A1 * | 2/2002 | Weinlaender | ............... | 345/705 |
| 2003/0030668 A1 | 2/2003 | Morrison | | |
| 2004/0006475 A1 | 1/2004 | Ehlen et al. | | |
| 2006/0168335 A1 * | 7/2006 | Hodjat et al. | ................ | 709/239 |
| 2007/0027733 A1 * | 2/2007 | Bolle et al. | .................... | 705/7 |

FOREIGN PATENT DOCUMENTS

| | | | | |
|---|---|---|---|---|
| JP | 02021320 A | * | 1/1990 | |
| JP | 04291415 A | * | 10/1992 | |
| JP | 07284034 A | * | 10/1995 | |
| JP | 10021037 A | * | 1/1998 | |
| JP | 2000137726 A | * | 5/2000 | |
| JP | 2000330683 A | * | 11/2000 | |

OTHER PUBLICATIONS

"How to Use Microsoft Windows XP" by Walter Glenn, published by Pearson Education inc. in 2002, pp. i, ii, 184, 185.*

* cited by examiner

*Primary Examiner*—Rachna S Desai
*Assistant Examiner*—Gregory A Distefano
(74) *Attorney, Agent, or Firm*—Kenyon & Kenyon LLP

(57) ABSTRACT

In a system and method for providing user help information, based on a user history it may be determined that an event has previously occurred, based on the determination a portion of stored user help information that includes information indicating how to avoid recurrence of the event may be automatically and selectively provided without receiving a request for the provided portion.

18 Claims, 2 Drawing Sheets

SYSTEM AND METHOD FOR PROVIDING USER HELP

BACKGROUND

Computer applications include a vast number of features, many of which require a user to perform a complicated set of steps. Performance of such steps is often not intuitive and a user therefore often does not perform the correct steps, therefore failing to accomplish a task the user intended to perform and/or causes an error.

It is conventional to provide a database of user help information so that when the user encounters an error or determines that the user requires instruction on how to proceed, the user may retrieve pertinent information from the database.

It is conventional to display user help information in response to a user request for help. This requires the user to spend time searching for the correct help topic and distracts the user from the actual performance of the tasks the user intended to perform.

It is also conventional to provide user help information in response to an action performed by a user in error. This causes time to be wasted since it requires the user to perform the action multiple times, until the user performs the action correctly. Furthermore, the user often is provided with the help information for a particular action after the user's attention is already directed to a different action, thereby causing confusion and hesitation. For example, it often occurs that a user enters data in a number of fields of an electronic form and, after all fields are filled, clicks "submit." The error is detected and user help information is provided after the user clicks "submit." If the error relates to one of the first fields of the form, by the time the user receives the user help information, the user's attention is no longer directed to the field and the data required for the field. Furthermore, a user often does not know how to perform a certain action and therefore makes no attempt to do so. In this instance, no error occurs, but the user nevertheless requires help which is not provided.

It is also conventional to provide user help information to help a user perform an action even before an attempt by the user to do so. For example, instructions are often displayed near a field indicating the type of information the user is to enter into the field, and/or instructions are often displayed indicating steps to be taken by the user to perform a variety of possible actions. However, to display all such possible user help instructions clutters the display, often distracting the user from the essential data displayed on the page.

Thus, there is a need in the art for a system and method that selectively and automatically provides user specific help information based on a user history.

DETAILED DESCRIPTION

Embodiments of the present invention relate to a computer system and method that provide user specific help information, where the provision of the user help information is not made in response to a request for user help or in response to an error event. Embodiments of the present invention relate to a computer system and method that may selectively provide user help information based on a user history. The user history may indicate particular problems, actions, and/or errors associated with the user and associated with particular portions of a collection of user help information. A problem may be indicated when a user fails to act in a manner, intent of performance of which it is determined is highly probable. An action may be indicated when it is determined that the user has performed in a manner that does not produce an error, but does not allow for completion of a task. For example, for completion of a task it may be required that the user enter a number amount in a particular field. While it may be that no error occurs when the user enters data other than a number amount, if the user later attempts to perform the task for which the number amount was required, the user history may indicate as an error the occurrence of the previous action of entering data other than a number amount. An error may be indicated when an error results from the user's action. The particular portions of the user help information may be provided because of the association of the indicated problems, actions, and/or errors with the particular portions of the user help information, while other portions of the user help information may be omitted if none of the indicated problems, actions, and/or errors are associated with the other portions.

Figure 1:
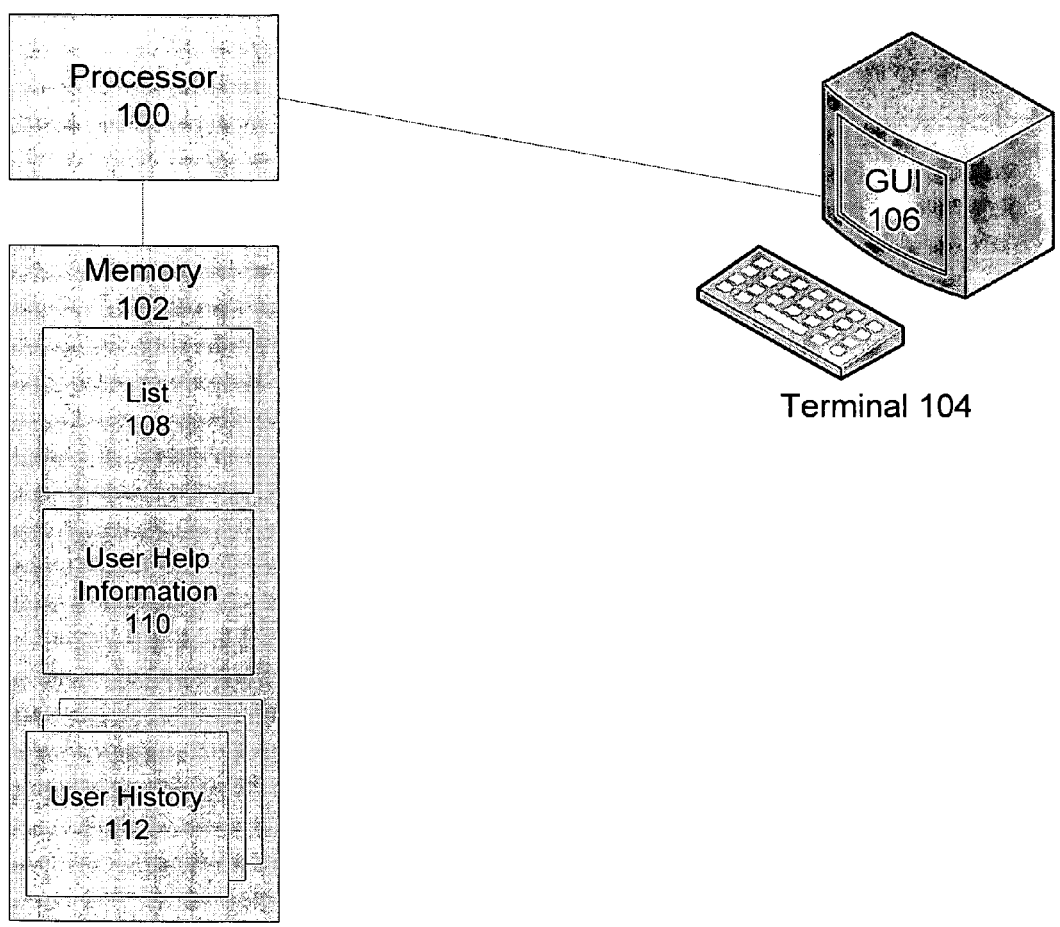
FIG. 1 is a block diagram that illustrates example components of a system according to an example embodiment of the present invention.

FIG. 1 is a block diagram that illustrates example components of a system according to an example embodiment of the present invention. A processor 100 may execute one or more sets of program instructions stored in a memory 102. The particular instructions executed by the processor 100 may depend on input provided by a user via an input device, e.g., a keyboard, a mouse, a touch pad, or any other conventional input device. The input device may be, e.g., at a terminal 104. At the terminal 104 may be an output device, e.g., a graphical user interface (GUI) 106. Output obtained during execution of the program instructions may be provided to the user via the output device. For example, the processor 100 may provide data for generating a display at the GUI 106 including the obtained output.

For one or more program instruction sets that may be executed by the processor 100, there may be stored a list 108 of problems, actions, and/or errors that may occur during execution of the program instruction sets. Which of the list 108 occur may depend on user input. For each problem, action, and/or error of the list 108 may be stored a corresponding solution in a set of user help information 110. For example, the list 108 may include for each entry in the list 108 a pointer to a corresponding solution in the set of user help information 110. Any conventional manner of linking data may be used. While FIG. 1 illustrates the list 108 and set of user help information 110 as separate data entities, such that linking of particular solutions to particular problems, actions, and/or errors is required, e.g., by pointers, it will be appreciated that the list 108 and set of user help information may be combined into a single data entity. For example, they may be combined into a single flat file. It will also be appreciated that a single problem, action, or error is not limited to one pointer. For example, for a particular problem, action, or error, a combination of two or more solutions, e.g., which may each be used separately for other problems, actions, and/or errors, may be appropriate. In this instance, the list 108 may include two or more corresponding pointers for the particular problem, action, or error.

Each problem, action, and/or error of the list 108 may be uniquely identified. For example, the identification may be by an assigned identification number, a memory address at which it is listed, or any other conventional way in which to uniquely identify a particular stored data element. For a user, a corresponding user history 112 may be stored that identifies particular problems, actions, and/or errors listed in the list 108, e.g., with a memory address pointer or with a unique identification number. The particular problems, actions, and/or errors identified may be based on particular problems and/or errors encountered, and/or particular actions that have been taken during execution of and that are associated with a program. When the problem, action, and/or error occurs, the system may update the user history 112 to include an identification of the encountered problem, action, and/or error. A non-exhaustive list of additional information that may be stored in the user history 112 is a number of times a particular event has occurred, a date and/or time of the occurrence of the event, a particular application and/or portion thereof or display used by the user at the time of the occurrence of the event and to which the occurrence of the event relates, a number of times the user has used the same application and/or portion thereof or display without recurrence of the event, and/or information regarding the user's role, e.g., manager, clerk, etc. The user history 112 may additionally include a log of steps performed by the user. For example, the user history 112 may record all steps performed since log-in or all steps performed for each task started by the user.

During execution of program instructions, the system may determine, based on a user history 112 associated with a logged in user, whether to output a portion of the user help information 110. For example, the user history 112 may indicate that a particular event of the list 108 associated with a portion of the user help information 110 has previously occurred. The event or the user help information may be associated with particular portions of the executed program. For example, the event may be associated with a particular point or points in a sequence of executed instructions. (It will be appreciated that a sequence of program instructions need not be written in sequence in a program, but may include jumps and interrupts.) Accordingly, at the particular point(s) in the sequence, the system may, in response to program instructions at said point(s), determine whether to output the portion of the user help information 110 associated with a particular event. Accordingly, the system may output the portion of the user help information 110 during execution of the associated program. In particular, the system may output the relevant user help information at a point in the execution of the program that is before the point at which the event previously occurred or before a first possible point at which the event can occur, i.e., prior to recurrence of the event. For example, the event or user help information may be associated with required user data entry into an electronic form displayed in response to program instructions the processor 100 is currently executing. The form may include fill-in fields that require particular types of data, such as a number, a date, etc. The user history 112 may indicate that the user has previously entered incorrect data types into the fields of the form. Accordingly, when the form is displayed, the system may provide instructions indicating the types of data required for the fields of the form prior to entry by the user of data into the data fields of the form. If the user history 112 indicates that the user has previously entered incorrect data into only some of the fields, then the system may display instructions for those particular fields, but may refrain from displaying instructions for the other fields in the form. For example, the instructions may be displayed in a vicinity of the display area in which the particular fields are displayed.

In one embodiment, the user history 112 may include a table including a list of the events of the list 108, or a list of events that are each associated with one or more events of the list 108, and for each event of the user history 112, the user history 112 may indicate whether the event has occurred. It may also include for one or more of the entries additional information discussed above.

A plurality of user histories 112 may be stored, each for a different user. For example, users may log into a system that provides for access by the user to use programs. Each user may be assigned a different log-in ID. The log-in ID may be a username entered by the user during log-in. Alternatively, a plurality of terminals, which may each be uniquely identified, e.g., via a network address, may be provided with access to the system. For each username, or terminal, a corresponding user history 112 may be stored.

In one example embodiment, different users may be assigned different roles. The user history 112 may identify a user's role. The particular portion of the user help information 110 provided for instruction regarding a particular event may vary depending on the user's identified role. For example, the user history 112 and the method of providing user help information 110 based on the user history 112 may be provided for a company portal. Company employees may log into the portal. A user history 112 may be maintained for each company employee, and may identify the employee's role in the company. The steps to be taken at a particular point in program execution within the portal may depend on the user's role. For example, a supervisor may be able to and/or required to enter different information than a lower level employee. Accordingly, an example difference regarding the user help information 110 provided depending upon user role may be that for avoiding recurrence of an event pertaining to the entering of incorrect information, the system and method may provide instructions to a first user to enter a first kind of information and to a second user to enter a second kind of information.

Further, whether what occurs is detected by the system and entered into the user history 112 as a problem, action, and/or error event may depend on the user's role. For example, at a particular point during program execution, entry by the user of particular data may be detected as such an event if the user's role is a first role for which different data was expected, but not if the user's role is a second role for which the entered data was expected.

In one example embodiment, the system may provide the user help information 110 all times the user encounters the part of the system with which the previous event is associated. According to another embodiment, the system may provide it only once before recurrence of the event, and then again only if the user again encounters the problem, action, and/or error. For example, after output of the relevant portion of the user help information 110, the system may clear the entry in the user history 112 corresponding to the event for which the user help information 110 was displayed. If the event recurs, the relevant user help information may be displayed in response thereto, as in conventional systems. Further, the system may reset the entry in the user history 112 associated with the event. According to another embodiment, there may be a counter set to a predetermined or user input number when the event occurs. The counter may be decremented each time the user uses the system, a particular program of the system, or a particular portion of the program with which the event is associated. When the counter reaches zero, the entry may be cleared. In a slight variation of this embodiment, the counter may be decremented each time the user uses the system, program, or portion thereof without recurrence of the event. Further, if the event does recur, the counter may be reset in response thereto to the predetermined or user input number. In one example embodiment, different numbers may be used for different entries, so that user help information for more complex problems is provided more often than user help information for simpler problems. In an alternative embodiment, the system may use timestamps to determine when to clear an entry. After a certain amount of time elapses from the time the event occurred, the system may clear the entry.

In one example embodiment, for some events listed in the list 108, the system may provide the corresponding portion of the user help information 110 upon a condition that the event has occurred a predetermined number of times. For example, the event may be a termination of a procedure by the user before completing all steps of the procedure. The user may do this because the user decides not to complete the procedure or because the user does not know how to complete the procedure. If the event occurs numerous times, it is probable that the reason for the occurrence of the event is the user's lack of knowledge. Accordingly, the system may provide the relevant portion of the user help information 110 if the user history 112 indicates that the event has occurred more than a predetermined number of times.

In one example embodiment, instead of, or in addition to, providing user help information 110 based on the user history 112 when the relevant part of a program is executed, the system may provide the user-specific portions of the user help information 110 as soon as the user logs into the system. For example, a user-specific help manual may be generated, in addition to the general help manual which may be accessed by any user. The user-specific help manual may be output in response to a request therefor. For example, an icon for the user-specific help manual may be generated and displayed for selection by the user for requesting the user-specific help manual. Alternatively, the user-specific help manual may be immediately output when the user logs into the system even without a request therefor.

In one example embodiment, the system may display the user-specific help manual at log-in only if the user had previously logged off of the system without completing a task the user had begun and with which at least a portion of the user-specific help manual is associated. Similarly, in an embodiment in which the system does not provide the user-specific help manual that includes user help information 110 associated with all indicated events of the user history 112, but instead provides only user help information 110 associated with events corresponding to a currently executed portion of a program, the system may provide at log-in user help information 110 associated with an event corresponding to the task that had been previously begun but not completed.

Figure 2:
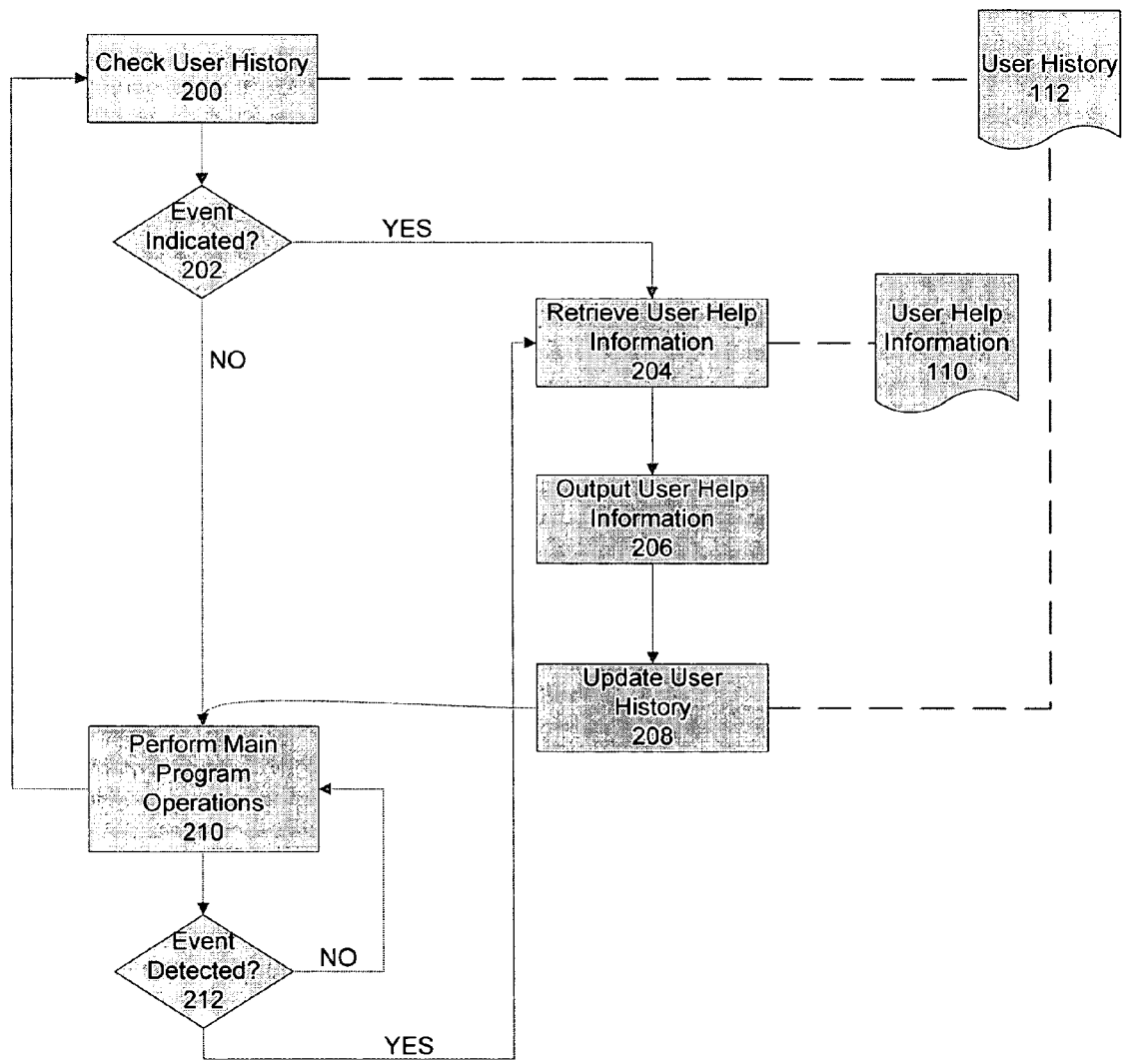
FIG. 2 is a flowchart that illustrates an example procedure that may be performed according to an example embodiment of the present invention.

FIG. 2 is a flowchart that shows an exemplary sequence of a procedure that may be executed according to an embodiment of the present invention. When a program is first loaded for execution, for example, at log-in, the system may, at 200, check the user history 112 to determine whether any event associated with user help information is indicated to have occurred. At 202, the system may determine whether an event is indicated. If it is determined that an event is indicated, the system may, at 204, retrieve relevant user help information 110, and output the retrieved information at 206. As discussed above, the events to be detected at log-in may be all events, particular events associated with portions of the program to executed at log-in, and/or those associated with a task that has been started but not completed.

At 208, the system may update the user history 112. For example, as discussed above, the system may update the number of times the user help information has been output. At 210, the system may perform the main program operations. At predetermined intervals or at predetermined points of program execution, the system may return to 200 to check the user history 112 for events associated with the portion of the program being executed at the time the user history 112 is checked.

During execution of the main program operations, the system may detect, at 212, whether an event associated with user help information 110 has occurred. If an event is detected at 212, the system perform 204 to 208 and return to 210 to continue performance of the main program instructions. At 204, after detection of an event at 212, the system may retrieve user help information 110 associated with the detected event. At 208, after detection of an event at 212, the system may update the user history 112 to indicate the occurrence of the event. Other information may also be updated, as discussed above. Additionally, although not shown in the sequence illustrated in FIG. 2, 208 may be performed after each step or after particular step performed since log-in or for particular tasks.

Consider the foregoing embodiments as applied to an exemplary installation in which the system provides for the management of Purchase Orders (P.O.). The system may aid in the performance of tasks that require the user to perform a number of steps. For example, the system may aid the user in generating and sending out a P.O. A required step may be to select a P.O. form type. For example, different P.O. forms may be used depending on the suppliers for which the P.O.s are intended. A required step may be to select a particular supplier. A required step may be to select a preferred method of delivery. A required step may be to select a method by which the P.O. is to be sent to the suppliers. After performance of each of these steps, the system may update a log in the user history 112 to indicate the step's performance. If, for example, the user has entered all required information so that the P.O. is ready to be sent, but the user has not selected a method by which the P.O. is to be sent, the system may detect that the user does not realize that it is required for the user to perform this step, or does not know how to do so. In response to this detection, the system may provide to the user the portion of the user help information 110 that corresponds to this step. The system may also update the user history 112 to indicate that the event of omitting this step has occurred. Based on this indication, when the user prepares additional P.O.s and reaches a portion of the program at which this step may be performed, the system may again provide the relevant user help information 110, even without again detecting omission of the step.

In one example embodiment, the system may detect occurrence of an event of a failure to perform if the user attempts to log out or to switch programs without performing the anticipated step. In an alternative or additional embodiment, the system may detect occurrence of the failure to perform even if the user does not log out or switch programs. For example, detection may be based on non-performance of a particular step for a predetermined amount of time that elapses. For example, as soon as the particular step may be performed, the system may start a timer. If the particular step is not performed after the predetermined amount of time elapses, the system may detect the failure to perform event. Alternatively, the system may start the timer as soon as the particular step is the only step yet to be performed for completing the started task or as soon as it is required to perform the particular step in order to proceed further with respect to completing the task. In a slight variation of the above, after the timer is started, if any step of the task, even not the particular step, is performed, or alternatively, if any step of any task is performed, the timer may be reset. It will be appreciated that there are other variations of the above described rule-sets according to which the system may detect occurrence of a failure to perform.

In one example embodiment, the system may provide user options with respect to when to display user help information 110. For example, the user may select an option for providing user help information 110 regarding a next step to be performed with respect to a particular task or all tasks, regardless of a detection or indication of occurred event. If this option is selected, the system may refrain from checking the user history 112, since the help information 110 is to be provided regardless of any indication of an event in the user history 112. Further, the help information 110 may be provided even before a timer time out. In one embodiment, the timer may be started even if this option is selected in order to update the user history 112 in the event of a failure to perform.

According to the embodiment in which the system provides a user-specific help manual upon a condition that the user had previously logged off of the system without completing a task, if the user logs off of the system before completing preparation of or sending out of the P.O., and saves the P.O. for completion at a later time, then when the user logs back into the system the system may provide the user-specific help manual if it includes help information 110 related to the task.

In an example embodiment of the present invention, the system may provide user-specific help manuals that are also task specific. For example, if the user opened a number of P.O.s, and is up to a different stage for each, then the system may provide at log-in different sets of user help, each corresponding to a different one of the P.O.s. For example, if for P.O.1 the user is up to step 3 and for P.O.2 the user is up to step 5, then the system may provide a set of user help for P.O.1 that includes information related to steps 4 and on, and a set of user help for P.O.2 that includes information related to step 6 and on. All sets may be provided at log-in. Alternatively, a set of user help may be provided when the corresponding P.O. is opened. According to this embodiment, the user history 112 may include a plurality of sub-user-histories, each for a different task.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method for providing user help information, comprising:
   in response to reaching, in a sequence of executed instructions, a point that is associated with an event, a processor automatically and selectively providing a portion of a user help information upon a condition that a user history indicates that the event has previously occurred at or subsequent to a previous reaching of the point; and
   in response to performance of a first operation by a user, the processor updating the user history to indicate performance of the first operation, wherein the portion is provided in response to a log-out operation by the user when the user history both indicates performance of the first operation and does not indicate performance of a second operation.

2. The method of claim 1 wherein the reaching of the point, in response to which the portion is provided, is during a current execution without occurrence of the event.

3. The method of claim 1, wherein the portion includes information indicating how to avoid recurrence of the event.

4. The method of claim 1, wherein the sequence of executed instructions are executed in association with a user with which the user history is associated.

5. The method of claim 1, further comprising:
   recording a number in the user history, the recorded number indicating times that the portion is provided based on the reaching of the point; and
   updating the recorded number in the user history each time the portion is provided based on the reaching of the point;
   wherein the portion is provided upon a further condition that the recorded number does not exceed a predetermined number.

6. The method of claim 5, further comprising:
   resetting the recorded number each time the event is detected.

7. The method of claim 1, further comprising:
   in response to the log-out operation, updating the user history to indicate an event of non-performance of the second operation if the user history both indicates performance of the first operation and does not indicate performance of the second operation.

8. The method of claim 1, further comprising:
   in response to a user request for the portion, providing the portion irrespective of contents of the user history.

9. The method of claim 1, wherein the portion includes information indicating how to avoid recurrence of the event, the method further comprising:
   compiling into a user-specific and task-specific help manual a plurality of portions of the user help information, each portion being associated with a corresponding event indicated in the user history to have occurred in association with a task with which the help manual is associated; and
   storing the task;
   wherein the help manual is provided to a user with which the help manual is associated in response to an operation by the user to open the stored task.

10. The method of claim 1, wherein:
    the user history includes an indication of a user role; and
    whether the event is determined to have previously occurred for recordation in the user history depends on the indicated user role.

11. A hardware-implemented computer-readable medium having stored thereon instructions adapted to be executed by a processor, the instructions which, when executed, cause the processor to perform a method for providing user help information, the method comprising:
    in response to performance of a first operation by a user, updating a user history to indicate performance of the first operation; and
    in response to a log-out operation by the user:
       determining based on the user history whether the user performed the first operation and whether the user performed a second operation; and
       automatically and selectively providing a portion of a user help information in response to a determination, based on the user history, that both the user performed the first operation and also did not perform the second operation.

12. A computer-implemented method for providing user help information, comprising:
    in response to performance of a first operation by a user, a processor updating a user history to indicate performance of the first operation; and in response to a log-out operation by the user, the processor:
determining based on the user history whether the user performed the first operation and whether the user performed a second operation; and
automatically and selectively providing a portion of a user help information in response to a determination, based on the user history, that both the user performed the first operation and also did not perform the second operation.

13. The method of claim 12, further comprising:
compiling into a user-specific help manual a plurality of portions of the user help information, each portion being associated with a corresponding event indicated in the user history to have occurred.

14. The method of claim 13, wherein the user-specific help manual is provided to a user with whom the user history is associated in response to log-in by the user.

15. The method of claim 14 wherein each of the plurality of portions includes information indicating how to avoid recurrence of the event corresponding to the respective portion.

16. The method of claim 15, further comprising:
providing a selectable icon corresponding to the help manual, selection of which is interpreted as an instruction to provide to a user with whom the help manual is associated content of the help manual.

17. The method of claim 13, further comprising:
providing a selectable icon corresponding to the user-specific help manual, selection of which is interpreted as an instruction to provide to a user with whom the user-specific help manual is associated content of the user-specific help manual.

18. The method of claim 12, wherein:
the user history includes an indication of a user role; and
the portion provided depends on the indicated user role.

* * * * *